United States Patent Office 3,396,041
Patented Aug. 6, 1968

3,396,041
METHOD OF PRODUCING REHYDRATA-
BLE, FREEZE-DRIED PEANUT BUTTER
PRODUCTS
Maurie Laskin, Milwaukee, Wis., assignor to W. R. Grace
& Co., a corporation of Connecticut
No Drawing. Continuation-in-part of application Ser. No.
464,867, June 17, 1965, which is a continuation-in-part
of application Ser. No. 324,240, Nov. 18, 1963. This
application Mar. 1, 1967, Ser. No. 619,584
6 Claims. (Cl. 99—204)

ABSTRACT OF THE DISCLOSURE

Producing a rehydratable, cellular, freeze-dried peanut butter by admixing peanut butter with water, freezing at atmospheric pressure to a hard solid and freeze-drying at low pressures.

---

This application is a continuation-in-part of U.S. application Ser. No. 464,867, filed June 17, 1965, now abandoned, which was in turn a continuation-in-part of U.S. application Ser. No. 324,240, filed Nov. 18, 1963, now abandoned.

The present invention relates to freeze-dried peanut butter products; to methods for preparing them; and to novel candy and/or cookie items incorporating the dried products.

Freeze-dried products, e.g., milk, whole blood, eggs, fish, various vegetables, soups, etc., and methods for preparing them are known in the art.

It is well understood that freeze-drying techniques rely on the principle of sublimation of ice crystals and diffusion of the resulting water vapors through and out of the product. In the known usual method of freeze-drying the product to be dried is typically frozen through the use of evaporative cooling in a vacuum chamber.

In accordance with the inventions described in the above-mentioned parent applications a variety of novel freeze-dried products are made available by use of a process in which the product to be dried is first "hard" frozen at atmospheric pressure and then introduced into the vacuum chamber to dehydrate. It has now been found that novel peanut butter-containing products can also be prepared by similar techniques.

It has now been discovered that cellular freeze-dried, rehydratable peanut butter-containing products can be prepared by thoroughly blending one part by weight of peanut butter with about 0.2 to about 1.5 parts (preferably about 0.3 to about 0.75 part) by weight of water and, where desired or indicated, a sufficient amount (typically this will be from about 3 to 10 percent, by weight, of the total weight) of a suitable emulsifier to provide a substantially uniform dispersion of water throughout the blend; quickly freezing the blended materials at or about atmospheric pressure to a hard solid; and then freeze-drying the solid frozen blend by dehydration at low pressures and at temperatures at which the frozen portions of the product remain in the frozen state until dehydration is substantially complete. The resulting novel products are eminently suited for use as centerpieces in chocolate coated candy and/or cookie items. If desired the novel freeze-dried peanut butter-containing products may include sweetening agents such as sugar, glucose or the like to enhance such confectionary utility. The sweetening agents, when used, may comprise from about 5 to about 40 percent by weight based on the total weight of the materials which are to be blended, frozen and dried.

In one further aspect of the invention, a very light, highly cellular product (one in which the volume of the dehydrated product is at least about 1.5 times the volume of the peanut butter incorporated therein) is made by uniformly admixing peanut butter in suitable desired proportions with a previously prepared highly aerated blend of water and emulsifier; rapidly freezing the admixture to temperatures sufficiently low to retain its volume and shape, and then freeze drying as above described. The amount of peanut butter in the said admixtures can range from about 20 to about 80, preferably about 40 to about 60, percent of the combined weight of peanut butter, water and emulsifier. As previously indicated, from about 5 to 40 weight percent of sweeteners, based on the total weight of all materials included in the admixture, may optionally be added.

Typical examples of peanut butter materials that can be used in the practice of the present invention are found, for example, in "The Chemical Formulary," H. Bennett (chief editor), Chemical Publishing Co., Inc., New York, N.Y., as follows:

Vol. I (1933): p. 75, peanut butter
Vol. II (1935): p. 199, peanut filling
Vol. VIII (1948): pp. 190–192, peanut butters
Vol. X (1957): pp. 174–176, peanut butter.

Prior to introduction into the freeze-drying chamber, the peanut butter containing product must be solidly frozen so as to have a hard frozen surface which, in handling and forming, is not predisposed to melt, thaw or soften. In this connection, a temperature of −10° Fahrenheit or preferably −20° Fahrenheit or below is typically used, although the melt or thaw point of the particular product is variable, depending upon its formulation, i.e., the various amounts and types of ingredients (e.g., starch, sugar, etc.) therein. It has been found, especially with respect to the highly cellular products of this invention, that a rapid freeze to a very low temperature is particularly preferred. For this purpose, freezing with liquid nitrogen or liquid nitrogen vapors to temperatures as low as −50° to −200° Fahrenheit or lower has been found to be very satisfactory. One suitable freezing process for this purpose is the one marketed by the National Cylinder Gas Division of Chemetron Corporation and described in their published trade literature.

The dehydration (freeze-drying) step is carried out at a pressure below about 1.5 millimeter of mercury (absolute), and in the preferred embodiments of this invention, below about 1.0 millimeter of mercury (absolute).

The peanut butter product is heated during the dehydration step by means of radiant energy which is emanated from the surface of the heat exchanger platens or surfaces in the freeze dryer. In the initial stages of the process, while the vacuum level is being established, little or no heat may be required, particularly if the product temperature equilibrium is being established by sublimation cooling under vacuum. When heating from outside sources is required to maintain the dehydration at an economically feasible rate, it is provided by the heat exchangers. These may be operated over a broad range of temperature and are adjusted to provide sufficient heat to maintain sublimation or dehydration at a maximum, but not so high in temperature to cause melting or thawing of the product being dried. Preferably, but not necessarily, higher temperatures are used in the initial stages of the dehydration and these are slowly decreased in stepwise fashion as drying progresses. A broad range of heat exchanger or platen temperatures that can be employed is from about 250° Fahrenheit to about 90° Fahrenheit, and preferably no higher than 160° Fahrenheit. The product temperature, at least with respect to the frozen undehydrated portion, should be maintained at a point where no substantial thawing takes place, i.e., about −10° Fahrenheit or less during the drying step.

The time of the drying step is variable but ordinarily can be carried out over a period of from about one to about twenty hours. In the method of the present invention the peanut butter-containing product should be molded or otherwise formed into monolithic slabs, balls, pieces, or sheets, preferably less than 25 mm. thick, and in the most preferred instance about 12 mm. or less in thickness, before placement in the freeze-drying apparatus. Ordinarily the thinner slabs permit the more rapid diffusion of vapor from the core of frozen material being dehydrated, as well as presenting a broader sublimation interface. The products are dried to a low moisture content of less than 4 percent moisture (weight basis), preferably less than 1½ percent moisture.

The described method will produce a monolithic unit which can be used per se as a confection or may be used as a component thereof, such as for example a candy bar or piece filler, which is coated with chocolate, carmel, or like candy coating. It should be understood that for best preservation, when the products to be used per se (i.e., without chocolate or other candy coating), the dehydrated frozen products are stored in a manner to exclude atmospheric moisture, such as in hermetically sealed cans under nitrogen pack or laminated moisture-proof bags.

The following examples illustrate the practice of the present invention:

Example 1

One part of a commercially available smooth-style peanut butter spread was blended with 0.75 part by weight water. About 6.7 percent by weight (based on total weight) of a commercially available emulsifier-containing edible vegetable base (Durkee's Betrkreme) was added to aid in thoroughly dispersing the water throughout the blend. About 20 percent by weight of sugar (based on the total weight of all materials) was also added. The resultant blend, a thick, whipped peanut butter, was subdivided into bite-size chunks and preliminarily cooled at atmospheric pressure to a temperature between about −10° and −15° Fahrenheit. The product was placed in a freeze-drier chamber (Freeze-Dry Pilot-Model UPFD–X, Vacudyne Corp.) and the chamber pressure was drawn down to about 0.5 millimeter of mercury (absolute) over a time period of about 5 minutes (hereinafter referred to as the "pull-down" time). At the end of the pull-down, the product temperature was about −20° Fahrenheit. The heat in the drier platens was applied according to the following schedule of platen temperature and time while the pressure was maintained at or below about 0.5 millimeter of mercury (absolute).

Platen temperature, ° Fahrenheit: Time
150° _____ 1 hour.
125° _____ 5 hours, 17 minutes.

The product was removed from the freeze drier unit after a total treatment time (including pull down) of 6 hours and 22 minutes. The freeze-dried product had a cellular or foam-like structure, a moisture content of less than about one percent, very good body and texture, and excellent flavor. This product can be stored, as such, in sealed containers resistant to moisture vapor transmissions without refrigeration for extended periods of time without significant degradation. Some of the freeze-dried chunks were coated with an enrobing layer of chocolate to make a candy bar or candy drop confection. The chocolate candy coating acts as an effective moisture barrier surrounding the freeze-dried monolithic core or centerpiece, thus precluding rehydration by atmospheric moisture.

Example 2

A commercially available smooth-style peanut butter spread was blended with 20 percent by weight of water based on total weight. The blend was cast into slabs about 9 to 12 mm. thick, which were initially frozen solid at atmospheric pressure and then freeze-dried, in the same manner as described in the previous example.

The blend used in this example, containing only peanut butter and water, had a slight tendency to puff under vacuum.

Bite-size chunks of the cellular relatively dense peanut butter monolith were coated with chocolate to produce chocolate candy pieces.

Example 3

A relatively very light weight, highly cellular peanut butter-containing product was formed from the following ingredients in the approximate amounts indicated:

| | Parts by Weight | Weight Percent |
|---|---|---|
| Gelatin (220 Bloom) | 4.3 | 0.6 |
| Cold Water | 17.0 | 2.5 |
| Vegetable base emulsifier (Durkee's Betrkreme) | 45.4 | 6.7 |
| Water | 105.0 | 15.5 |
| Granulated Sugar | 119.2 | 17.6 |
| 43° Glucose (Dextrose Equivalent (D.E.) of 42) | 45.4 | 6.7 |
| Salt | 1.4 | 0.2 |
| Peanut Butter * | 340.0 | 50.2 |
| | | 100.0 |

* Commercially available "Old Time Old Fashioned" Peanut Butter distributed by Randy's Inc. and made from selected peanuts and salt.

The gelatin was stirred into the cold water in a suitable container and slowly warmed to about 150° Fahrenheit to get complete dissolution.

The emulsifier, sugar, glucose, salt and remaining water were weighed into a separate container and brought to a boil while stirring. The solution was then poured into a household type mixing bowl and beat for four minutes at speed 1, five minutes at speed 6 and four minutes at speed 10. The mixer speed was then slowed to speed 4 and the gelatin solution was added while mixing continued. When all of the gelatin solution had been added the mixing speed was raised again to speed 10 for two more minutes.

The peanut butter was then added to the resulting highly aerated foamy mass and folded in until a uniform admixture was obtained. This gave a peanut butter containing product having about an 85 percent "overrun," i.e., a volume of about 185 percent of the volume of peanut butter added.

The admixture was divided into bite-size chunks and quickly frozen at atmospheric pressure to a temperature of about −20° Fahrenheit.

The solidly frozen admixture was then freeze-dried in the manner described in the preceding examples, at pressures of less than about 1.0 millimeter of mercury (absolute) and according to the following schedule of platen temperature and time, using the equipment described in Example 1.

Pull-down time, platen temperature
(° Fahrenheit) (5 minutes' time): Minutes
100° _____ 50
125° _____ 70
150° _____ 50
125° _____ 75
Heaters off (temperature drops to 90°) _____ 15

Product removed _____ 265

The resulting light weight, highly cellular peanut butter containing product had excellent body, texture and flavor. Some of the chunks were used as center-pieces in chocolate coated candy. These candy products were judged to be excellent.

It is to be understood that the products of this invention can be used in ways other than those specifically described. Thus, for example, it will be apparent that coating materials other than candy coatings may be used to protect the freeze-dried products from atmospheric moisture. Many edible coating materials which would serve such purpose are known to the art, e.g., gelatin, sodium carboxymethyl cellulose, methyl cellulose, and hydroxyl propyl methyl cellulose. Products thus coated can be used, for example, as additives for dry cereals; or as food for astronauts.

Furthermore, the dried products of this invention can be, and have been, reduced to a powder, in which form they can be used as additives for cake or cookie mixes, coatings for cereals or cookies or the like, and as raw materials for the preparation of tableted confectionary items of various sizes and shapes, (e.g., spheroidal, ellipsoidal, toroidal, etc.).

It is also possible under proper circumstances to direct vacuum dry the peanut butter-containing formulations (i.e., dry under very low absolute pressures without preliminary hard freezing) to produce a friable product adapted for preparation of powdered products useful for the same purposes as the powdered freeze-dried products.

What is claimed is:

1. A method of producing a rehydratable cellular freeze-dried peanut butter containing product which comprises uniformly admixing peanut butter with at least about 0.2 part by weight of water per part of peanut butter, freezing said admixture at about atmospheric pressure to a hard solid, and then freeze-drying the hard solid by dehydrating at low pressures and at temperatures at which the frozen portions of the product remain in the frozen state until dehydration is substantially complete.

2. The method of claim 1 in which said hard solid admixture is dehydrated to a moisture content of less than 4 percent by weight.

3. The method of claim 1 in which the dehydration takes place at pressures of less than about 1.5 millimeters of mercury (absolute).

4. Method of claim 1 in which the admixture additionally contains an edible emulsifier.

5. Method of claim 4 wherein the admixture also contains a sweetening agent such as sugar, glucose and the like.

6. Method of claim 5 wherein the emulsifier, water and sweetening agent are preliminary blended and aerated; the peanut butter is then admixed with the aerated preblend until a substantially uniform admixture is obtained; and the latter is rapidly frozen to a hard solid and then dehydrated; whereby a very light weight highly cellular product is produced.

References Cited

UNITED STATES PATENTS

| | | | |
|---|---|---|---|
| 1,415,893 | 5/1922 | Moore | 99—128 |
| 3,140,953 | 7/1964 | Roberts | 99—128 |
| 3,317,325 | 5/1967 | Durst | 99—126 |

RAYMOND N. JONES, *Primary Examiner.*

S. DAVIS, *Assistant Examiner.*

UNITED STATES PATENT OFFICE
CERTIFICATE OF CORRECTION

Patent No. 3,396,041                      August 6, 1968

Maurie Laskin

It is certified that error appears in the above identified patent and that said Letters Patent are hereby corrected as shown below:

Column 4, lines 51 to 59, the table should appear as shown below:

| | |
|---|---|
| Pull-down time | 5 minutes |
| Platent Temperature (°Fahrenheit) | time (minutes) |
| 100° | 50 |
| 125° | 70 |
| 150° | 50 |
| 125° | 75 |
| Heaters off (temperature drops to 90°) | 15 |
| Product removed | 265 |

Column 6, line 10, "preliminary" should read -- preliminarily --.

Signed and sealed this 6th day of January 1970.

(SEAL)
Attest:

EDWARD M. FLETCHER, JR.                 WILLIAM E. SCHUYLER, JR.
Attesting Officer                         Commissioner of Patents